Figure 2:
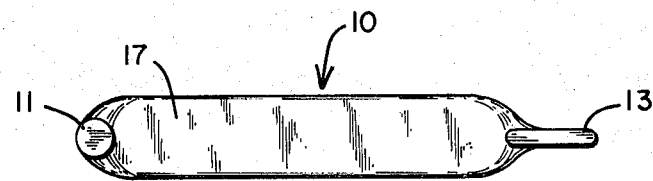

United States Patent
Doyle

[11] 3,776,176
[45] Dec. 4, 1973

[54] INDICATOR DEVICE WHICH CAN BE ILLUMINATED

[75] Inventor: Joseph E. Doyle, King of Prussia, Pa.

[73] Assignee: Master Electronics Corporation, Huntingdon Valley, Pa.

[22] Filed: Mar. 15, 1972

[21] Appl. No.: 234,828

[52] U.S. Cl.............. 116/129 L, 240/1 EL, 350/96
[51] Int. Cl............................................... G09f 9/00
[58] Field of Search.................. 116/129 L, 129 M, 116/136.5, DIG. 6, 124, 124.4; 240/1 EL, 2, 6.46; 350/96, 110

[56] References Cited
UNITED STATES PATENTS

| | | | |
|---|---|---|---|
| 2,328,485 | 8/1943 | Ott | 116/129 L |
| 2,392,581 | 1/1946 | De Juhasz | 116/129 L X |
| 3,498,723 | 3/1970 | Nichols | 350/96 B |
| 3,636,365 | 1/1972 | Houston | 350/96 B |

*Primary Examiner*—Louis J. Capozi
*Attorney*—William E. Cleaver

[57] ABSTRACT

The present device provides a fiber optic member, particularly shaped so that light from a light source can be virtually completely captured at one end and is directed to the other end where the viewer sees the light as a fine line. The fiber optic member is secured to a turntable or a beam, which is mounted on the shaft of a motor or shaft driving means. The illuminated fine line end of the fiber optic member is mounted so that it can be rotated under the face of a meter dial whereby the position of the illuminated fine line with respect to the graduations or marks on the face of the meter.

3 Claims, 3 Drawing Figures

PATENTED DEC 4 1973 3,776,176

INDICATOR DEVICE WHICH CAN BE ILLUMINATED

DESCRIPTION

The present invention related to metering devices and particularly to a device which provides a sharply defined illuminated line and which is moveable in response to the movement of an analog device such as a motor.

The present invention will be discussed in connection with a water depth and/or a fish locator. However, it should be understood that the invention has utility with other forms of metering devices. Water depth meters can very often be used as fish locators. It is usually the practice with water water depth meters have an ultrasonic transducer, such as a piezoelectric device, send bursts of ultrasonic energy toward the bottom of the body of the lake, river, or ocean. The ultrasonic energy reflects off the bottom of the body of water and returns to the transducer which in turn generates a voltage signal that ultimately produces an illumination of a lamp. In the prior art, the lamp has usually been a neon lamp mounted on a turntable. The turntable is mounted on a shaft of a constant speed motor. Further, in the prior art, the arrangement has been such that a magnet is secured to the underside of the turntable and a coil is located (in proximity to the path of the magnet) on the stator, or housing, of the device so that as the magnet passes the coil, a voltage is induced in the coil which ultimately produces a trigger signal to trigger the burst of ultrasonic energy. The speed of the motor is chosen to have a specific relationship with the velocity of sound in water. While the velocity of sound varies with the temperature of the water, and/or the consistency of the water (i.e., fresh water compared to salt water) this variation is considered negligible for most water enthusiasts' purposes.

In the prior art the use of a neon bulb as the illuminating element has at least two undesirable aspects. First there must be some means to transfer electrical energy from the stationary portion of the indicating device to the lamp which is rotating on the turntable. In the prior art this has been accomplished by means of slip rings and brushes, or a rotating transformer. Each of these means for transferring the electrical energy is bulky, costly and as in the case of the slip rings and brushes requires some degree of maintenance. Secondly, the neon lamp has been unsatisfactory from the standpoint of resolution. The lamp is usually about one eighth of an inch in diameter and hence a reading thereof is smeared or will be observed to cover three to five graduations. In other words if the depth of the body of water is 10 feet, the observer looking at a "neon light" depth meter might read the depth as "between ten and fifteen feet" because the graduations 10 through 15 would all be illuminated when the neon light is energized. It has been the practice to illuminate on the leading edge of the pulse developed in response to the reflected ultrasonic signal and hence the smeared light is usually from a position close to the intended graduation position to higher position graduations. In other words, in our example the water depth is 10 feet and the systems have usually been adjusted so that the neon light will be turned on somewhere close to the graduation indicating 10 feet but unfortunately remain on until the light has moved to the 15 foot graduation. Obviously if fish are detected giving a second illumination this second depth also is indefinite with the use of a neon light as the illuminating element. The present invention overcomes the infirmities of the neon bulb used in the prior art as will be discussed hereinafter.

SUMMARY

The present invention can be used in a water depth/fish locator meter and employs a plurality of optically conductive fibers, or light pipes which are formed to have a cylindrical input (input of light) end, an elongated oval output (output of light) end, (with a smoking pipe-like profile), and a relatively flat portion connecting the input end with the output end. Mounted on the stator of the meter, in close proximity to said input end is a light source which in the preferred embodiment provides collimated light. The cylindrical shape of the fiber optic piece at the input end virtually captures all of the light from the light source and transmits it from the input end through the optically conductive fibers to the output end. The output end of the fiber optic piece is formed into a narrow oval shape and hence it appears as a sharp line to the viewer. Since the light source is mounted on the stator there is no requirement for slip rings and brushes or a rotating transformer or the like and since the output end of the fiber optic piece is formed into a narrow end, the resolution is excellent and the viewer sees only one graduation illuminated.

Figure 1:
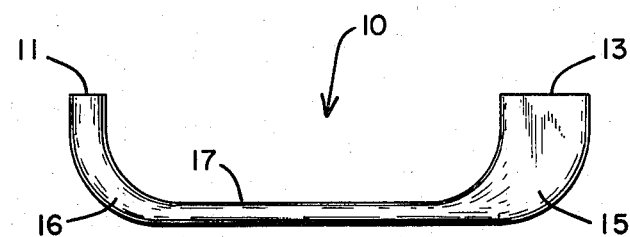

The objects and features of the present invention will be better understood in view of the teaching below taken in conjunction with the drawings wherein:

FIG. 1 is a side view of the fiber optic piece;
FIG. 2 is a top view of the fiber optic piece; and
FIG. 3 is a pictorial schematic showing the fiber optic piece mounted on a turntable of a constant speed motor in a water depth/fish locator meter.

Consider FIGS. 1 and 2 which show the configuration of the fiber optic piece 10. In FIGS. 1 and 2 the light receiving end 11 is shown as cylindrically shaped. Since, as will be discussed hereinafter, in the preferred embodiment the light source provides a collimated beam of light, the receiving end 11 has been formed cylindrically to capture substantially all of the light from the source. It should be understood that other shapes at the receiving end might be useful if such shapes permit the capturing, or collecting of a substantial part of the light emitted from the light source. The foregoing is necessary because the system is going to ultimately provide a strong output of light at the output end 13 and hence it is imperative that the maximum amount of light be captured at the input end 11. For the same reason, (i.e., the system should lose as little light as possible as it is transmitted from the source to the output end 13), the fiber optic piece 10 is employed rather than a single plastic element. It has been determined that if a single plastic element is used it is necessary to limit the bends in order to reduce the loss of light. For instance if the outside radius equals three times the thickness of the single plastic element, there will be a minimum of loss of light passing around the bends. However, since each optically conductive fiber is so small in diameter, it can meet this requirement for bends approaching 90. Accordingly the bends of a package of such fibers is not critical with respect to loss of light, and the use of the fibers is highly desirable.

In order for the fiber optic piece 10 to be formed so that its input end 11 is cylindrically shaped and so that its output end 13 is shaped like a narrow oval, the interconnecting portion, or bridge section 17, had to be particularly shaped. It was determined that if a solid piece of plastic were used it was not easily molded into the shape of the fiber optic piece shown in FIGS. 1 and 2. In addition it was found that when a solid piece was so formed there were losses of light as it was transmitted from the input end to the output end. Accordingly, in the preferred embodiment, the fiber optic piece (as its identification would indicate) is fabricated from thousands of tiny optically conductive fibers whose diameter is approximately 0.002 inches. These fibers can be fabricated from an acrylic material or glass and when procured from a manufacturer such as Dow Corning Co. are packaged in a "shrink down" tubing. The input end is heated locally, i.e., within a limited section, to set up the cylindrical shape at that end. Thereafter the tube containing the fibers is fitted or formed on a jig so that it assumes the configuration shown in FIGS. 1 and 2. The tube, with the fibers, is clamped so that it holds its shape and its configuration is maintained. Thereafter the tube with the fibers therein is vacuum impregnated with epoxy. Then the package is cured and the input end and output end are polished. Thereafter the "shrink down" tube is peeled off and the optic fibers remain joined together in a solid mass to make up the fiber optic piece 10. It should be understood that the bridge 17 need not be flat or as wide as shown in FIGS. 1 and 2. The shape of the fiber optic piece as shown in FIGS. 1 and 2 is a "natural" shape into which the fibers fall when the constraints of the input end 11 and output end 13 as well as the bends 15 and 16 are applied. Having a flat surface at the bridge section 17 is useful for securing the fiber optic piece to the turntable as will become apparent hereinafter. Having a plurality of fibers not only permits shaping more readily but each fiber is self contained, polished, etc., none of which conditions are disturbed by the reshaping, so that the light is transmitted from the input end 11 to the output end 13 with a minimum of loss of light.

Figure 3:
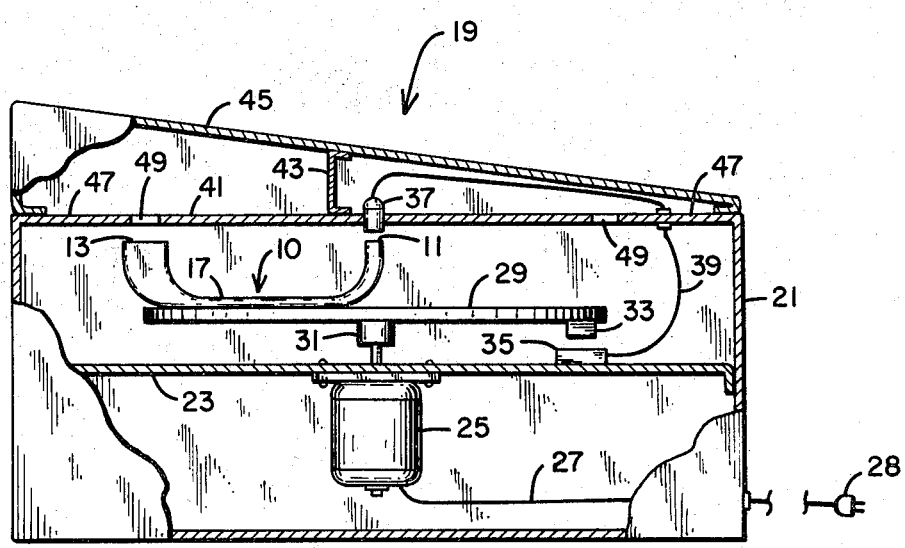

Consider now FIG. 3 which is a pictorial schematic of the fiber optic piece 10 being employed in a water depth/fish locator meter 19. In FIG. 3 there is depicted a water depth/fish locator meter 19, with a stator, or housing 21. Mounted in the housing 21 is a first support member 23, the underpart of which has a motor 25 mounted thereon. The motor 25 is a constant speed motor, usually rated at 1,440 rpm if the depth motor scale is 0 – 100 ft. However, it can be rated at other speeds to be synchronous with the velocity of sound for its particular use or in the alternative different graduated masks can be used. In FIG. 3 the electrical input 27 to the motor 25 is depicted on an ordinary plug wire. Since the motor will normally be run while on board ship, the motor used will usually be a direct current motor and may be battery driven.

As can be seen in FIG. 3 there is a turntable 29 mounted on the shaft 31 of the motor 25. Also, as can be seen in FIG. 3, on the underside of the turntable 29, there is mounted a magnet 33. In close proximity to the path of magnet 33 there is located on first support member 23, a transducer 35 including a coil. Actually the transducer is located outside of the meter (usually on the bottom of the boat) so that the ultrasonic energy can be directed to the bottom of the body of water that is being monitored. However, for the purposes of this discussion we can assume that the transducer is housed with the coil in the transducer 35.

It can also be determined from FIG. 3 that the fiber optic piece 10 is secured to the upper side of the turntable 29. The fiber optic piece 10 is secured to the turntable 29 by an epoxy cement, at the bridge section 17. It should be noted that the input end 11 is centered under the light source 37 and in the center of the turntable 29. In the preferred embodiment the light source 37 is a visible light emitting diode, often referred to as an LED., which is manufactured by Monsanto Corp. and others. The LED 37 provides a collimated light beam to the input end 11 when the light source 37 is energized in response to a signal from transducer 35, through the wires 39. The light source 37 is mounted through the center of the inside graduated panel 41 which is supported by the bracket 43 joining the viewing panel 45. The outside graduated panel 47 fits around the inside graduated panel 41 with a gap or slit 49, therebetween. It should be understood that other forms of light sources can be employed, but in the preferred embodiment an LED is employed because of its long life.

OPERATION

When the motor 25 is running by being energized from the power source 27, the turntable 29 revolves at a constant speed. Once per revolution the magnet 33 passes in close proximity to the coil of transducer 35. The passing of the magnet 35 over the coil of transducer 35 induces a voltage therein which causes the transducer to transmit a burst of ultrasonic energy. This burst of ultrasonic energy travels at the velocity of sound in water and reflects off the bottom of the body of water wherein the boat is located. The reflected energy returns to the transducer and generates a voltage signal thereat which acts to trigger some logic circuitry to turn on the light emitting diode 37. The light emitting diode 37 emits a collimated beam of light to the input end 11 of the fiber optic piece 10, irrespective of the position of the turntable 29 because the input end 11 is centered on the turntable 29 and is centered under the light source 37. The light from the light source 37 is transmitted along the thousands of fibers in the fiber optic piece 10 to the output end 13 whereat there is formed a narrow strip of light. The pulse generated by the reflected ultrasonic energy lasts for only an instant so that the narrow line of light is "on" for only an instant. The face of the meter can include phosphors which will cause the light to persist (as in a TV tube) for a longer period of time than the output end 13 is illuminated, although this is not a necessity.

Meantime the motor 25 keeps revolving so that the viewer sees a plurality of illuminations of the output end 13 which appears as a single constant illuminated line. If of course, the boat travels over a school of fish, the ultrasonic energy will reflect from the school of fish and create a second intermediate illumination of the output end.

Because the output end is a narrow oval and appears, when illuminated, as a narrow lighted line, it is easy for the viewer to determine the depth of the bottom of the body of water and/or the location of the fish. The illuminated indication is not smeared, i.e., it does not encompass a plurality of graduations.

The fiber optic piece 10 is very light in weight, in the order of 3 or 4 grams. Accordingly, it does not cause any problems with respect to having to balance the turntable to give longer life to the bearings etc., or compensate for eccentricities. The weight factor is a big advantage over the prior art. Further, as mentioned earlier, by using the fiber optic piece, there is no need for slip rings and brushes or a revolving transformer or any other means to transfer electrical energy from the stationary section of the meter to the revolving section.

I claim:

1. An indicator device which can be illuminated comprising in combination: a source of collimated light, a plurality of optically conductive fibers formed together into a light conducting piece, said light conducting piece having an input end, an output end, and a connecting section; said input end formed cylindrically and disposed in close proximity to said light source and formed with respect to said light source, so that a substantial portion of all of the light emanating from said source of light enters said input end; said output end formed so that the light conducted thereto is transmitted therefrom to appear as a thin line of light; said connecting section formed to conduct light from said input end to said output end and further formed to be readily secured to mounting means; movable mounting means holding said light conducting means at said connecting section and adapted to move said light conducting piece so that the position and illumination of said output end indicates the value of a signal to be detected.

2. An indicator device according to claim 1 wherein said connecting section is formed to have a relatively flat surface for securing it to said mounting means.

3. An indicator device according to claim 1 wherein said movable mounting means is a constant speed motor with a turntable mounted on the shaft of said motor and wherein said input end is disposed on said turntable over the center of the shaft of said motor.

* * * * *